United States Patent
Thornhill et al.

(10) Patent No.: US 12,278,730 B2
(45) Date of Patent: Apr. 15, 2025

(54) ANALYZING POLICIES EXECUTED IN A COMPUTER SYSTEM

(71) Applicant: INTERNATIONAL BUSINESS MACHINES CORPORATION, Armonk, NY (US)

(72) Inventors: Matthew Richard James Thornhill, London (GB); Keith Jeremy Posner, London (GB); David Jon Griffin, Reigate (GB)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 18/338,462

(22) Filed: Jun. 21, 2023

(65) Prior Publication Data

US 2024/0430166 A1     Dec. 26, 2024

(51) Int. Cl.
*H04L 41/0894* (2022.01)
*H04L 41/0893* (2022.01)

(52) U.S. Cl.
CPC ...... *H04L 41/0894* (2022.05); *H04L 41/0893* (2013.01)

(58) Field of Classification Search
None
See application file for complete search history.

(56) References Cited

U.S. PATENT DOCUMENTS

| | | |
|---|---|---|
| 11,449,379 B2 | 9/2022 | Gomes Pereira |
| 2009/0288135 A1 | 11/2009 | Chang |
| 2016/0315822 A1* | 10/2016 | Anderson ........... H04L 41/0893 |
| 2020/0120141 A1 | 4/2020 | Joseph |
| 2022/0129393 A1 | 4/2022 | Hodgson |
| 2022/0207241 A1* | 6/2022 | Bettencourt-Silva ... G06F 40/30 |

FOREIGN PATENT DOCUMENTS

| | | |
|---|---|---|
| EP | 2592513 A2 | 5/2013 |
| WO | WO2023229574 A1 * | 5/2022 |

OTHER PUBLICATIONS

Disclosed Anonymously, "System and method to optimize multicloud resources and policy preparations," IP.com, Aug. 2, 2020, 6 pages, IP.com No. IPCOM000263144D, Retrieved from the Internet: <URL: https://priorart.ip.com/IPCOM/000263144>.

* cited by examiner

*Primary Examiner* — Natisha D Cox
(74) *Attorney, Agent, or Firm* — Robert D. Bean

(57) ABSTRACT

There is provided a method, apparatus and computer program product for analysing policies executed in a computer system which comprises a plurality of entities. The system is operable to detect one or more policies within a set of policies that have executed a predetermined number of times within a time window; identify a plurality of co-occurring, and thereby related, policies based on the detecting; and group the identified co-occurring policies.

20 Claims, 5 Drawing Sheets

ANALYZING POLICIES EXECUTED IN A COMPUTER SYSTEM

BACKGROUND

The invention relates to event processing and more particularly to the analysis of policies which operate on system generated events.

The monitoring and repair of IT services in a client data centre, cloud or hybrid environment can be difficult across the many layers of a system (e.g., code, data, runtime, middleware, operating system, virtualisation, servers, storage, and networking).

Across all the many layers, it is key that all required components are operating correctly and that no parts of the system have failed. When a failure does occur, the teams supporting the services need to know that an issue has occurred and need some way of finding out how to diagnose and fix the issue.

Issues are usually indicated by events, which are emitted by entities (e.g., devices and applications) in an IT system in order to report their status. An event is a record containing structured data summarizing key attributes of an occurrence on a managed entity, which might be a network resource (e.g., a server or router), some part of that resource, or other key element associated with a network, services, or applications. More severe events usually indicate a fault condition in a managed environment and require human operator or automated intervention. Multiple events may indicate a single issue.

A system may attempt to provide an automated response to these issues. The definition of these automation actions may take the form of multiple policies, where policies comprise one or more rules that act on specific subsets of events, or artifacts derived from events (e.g., an object representing a group of related events, or an object that describes a set of duplicate events that represent a re-observed on going issue). The subset of events is defined by a number of conditions that match against the artifact, for example a specific event type or events from a specific resource with a high severity.

SUMMARY

There is provided a method, apparatus and computer program product for analysing policies executed in a computer system which comprises a plurality of entities. The system is operable to detect one or more policies within a set of policies that have executed a predetermined number of times within a time window; identify a plurality of co-occurring, and thereby related, policies based on the detecting; and group the identified co-occurring policies.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
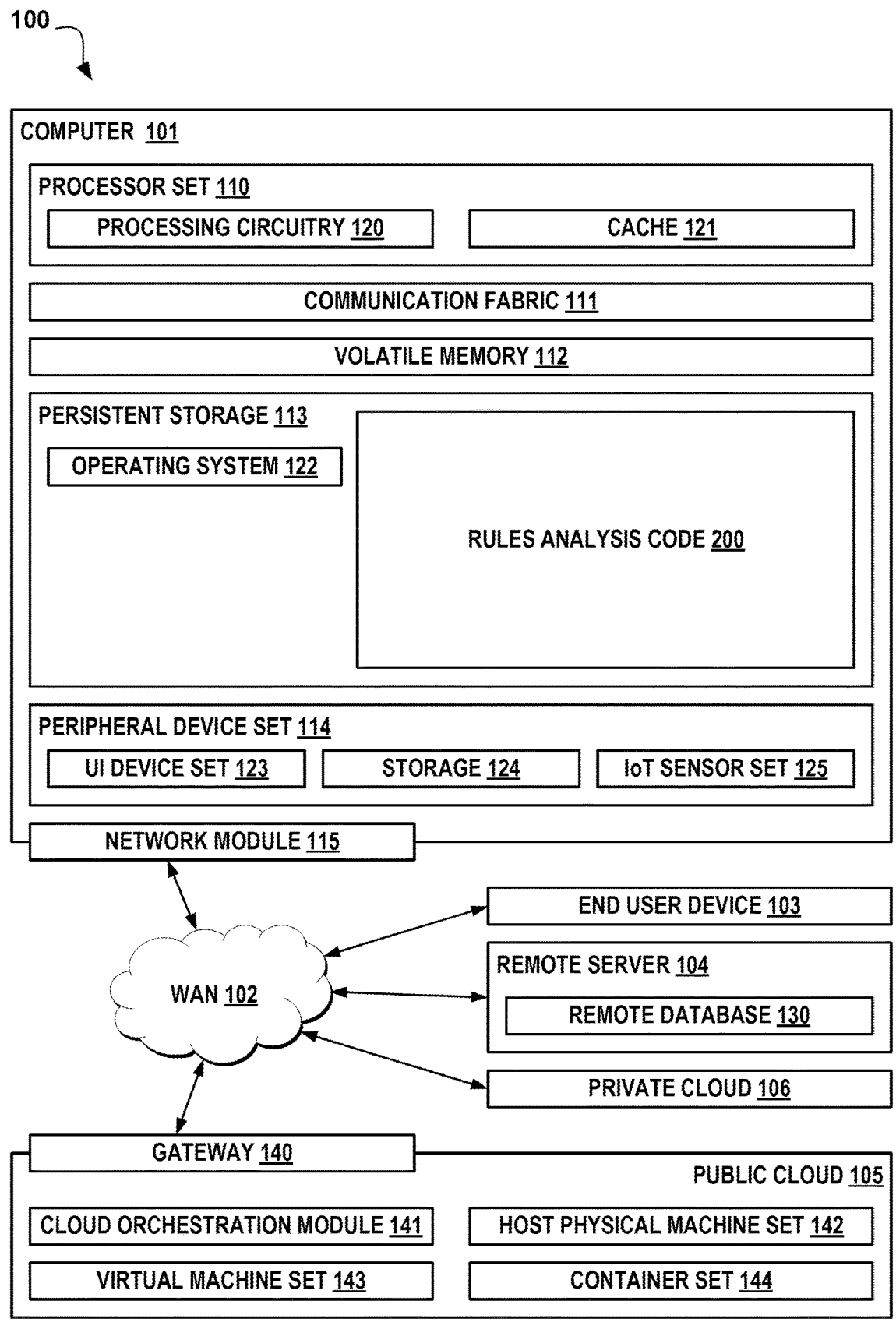
FIG. 1 is a block diagram of an example embodiment of a computing environment for the execution of at least some of the computer code involved in performing the present invention.

The monitoring and repair of IT services in a client data centre, cloud or hybrid environment can be difficult across the many layers of a system (e.g., code, data, runtime, middleware, operating system, virtualisation, servers, storage, and networking).

Across all the many layers, it is key that all required components are operating correctly and that no parts of the system have failed. When a failure does occur, the teams supporting the services need to know that an issue has occurred and need some way of finding out how to diagnose and fix the issue.

IT Service Management software provides a means for support teams to track and assign these issues. Issues are assigned to a member of the support team, known as an operator, who is then responsible for resolving the issue, usually by issuing a sequence of computer commands on an affected system.

Issues are usually indicated by events, which are emitted by entities (e.g., devices and applications) in an IT system in order to report their status. An event is a record containing structured data summarizing key attributes of an occurrence on a managed entity, which might be a network resource (e.g., a server or router), some part of that resource, or other key element associated with a network, services, or applications. More severe events usually indicate a fault condition in a managed environment and require human operator or automated intervention. Multiple events may indicate a single issue.

Typically, organisations want to reduce the amount of investigatory work their operators need to undertake, in order to optimise the time taken to resolve a given issue. One mechanism for doing this is to define rules which act to add additional context to issues before they are presented to operators. This additional context may consist of extra data items which describe the problem, information about possible resolutions or relationships between different events which pertain to the same issue. Additionally, organisations will seek to automatically execute resolution actions in the background in order to try and resolve an issue before an operator has to act on it.

The definition of these automation actions may take the form of multiple policies, where policies comprise one or more rules that act on specific subsets of events, or artifacts derived from events (e.g., an object representing a group of related events, or an object that describes a set of duplicate events that represent a re-observed on going issue). The subset of events is defined by a number of conditions that match against the artifact, for example a specific event type or events from a specific resource with a high severity.

For a given issue, there are likely to be many events indicating that issue, which may all trigger different policies that have been defined to add context to those events. Additionally, there may be policies acting on higher-level artifacts derived from those events; for example, there may be an artifact that represents a group of events that share a common cause, that a user may wish to add context to. The net result is that for any given issue, or type of issue, there may be large number of policies which act on it. Understanding the relationship between a large number of policies can be difficult.

In order to add extra automation, either to add additional context to an issue or execute automated actions, a user will look to create a new policy or edit an existing one. They will therefore need to gain an understanding of what policies already exist and how they currently affect the system. This is not a trivial process.

According to a one aspect, there is provided a method for analysing policies executed in a computer system which comprises a plurality of entities such as servers, applications, routers, et cetera, the system operable to emit a plurality of events providing status information for any of the entities in the system and wherein emitted events cause one or more policies to execute, the method comprising analysing which policies within a set of policies have executed a predetermined number of times within a time window of one another, in order to identify a plurality of instances of co-occurring, and thereby related, policies; and grouping policies based on such analysis.

The analysis may be performed using a rolling time window which is particularly advantageous in that it is able to identify more relationships than if a fixed time window was used.

In an embodiment the analysis is performed using association rule mining to identify co-occurring policies.

According to another aspect, there is provided an apparatus for analysing policies executed in a computer system which comprises a plurality of entities, the system operable to emit a plurality of events providing status information for any of the entities in the system and wherein emitted events cause one or more policies to execute, the apparatus comprising: one or more processors; a memory coupled to at least one of the processors; and a set of computer program instructions stored in the memory and executed by at least one of the processors in order to perform a method comprising: analysing which policies within a set of policies have executed a predetermined number of times within a time window of one another, in order to identify a plurality of instances of co-occurring, and thereby related, policies; and grouping policies based on such analysis.

According to another aspect, there is provided a computer program product for analysing policies executed in a computer system which comprises a plurality of entities, the system operable to emit a plurality of events providing status information for any of the entities in the system and wherein emitted events cause one or more policies to execute, the computer program product comprising: a computer readable storage medium, comprising computer program code that, when executed by a computer performs a method comprising the steps of: analysing which policies within a set of policies have executed a predetermined number of times within a time window of one another, in order to identify a plurality of instances of co-occurring, and thereby related, policies; and grouping policies based on such analysis.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 of FIG. 1 contains an example of an environment for the execution of at least some of the computer code involved in performing the inventive methods, such as RULES ANALYSIS CODE 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
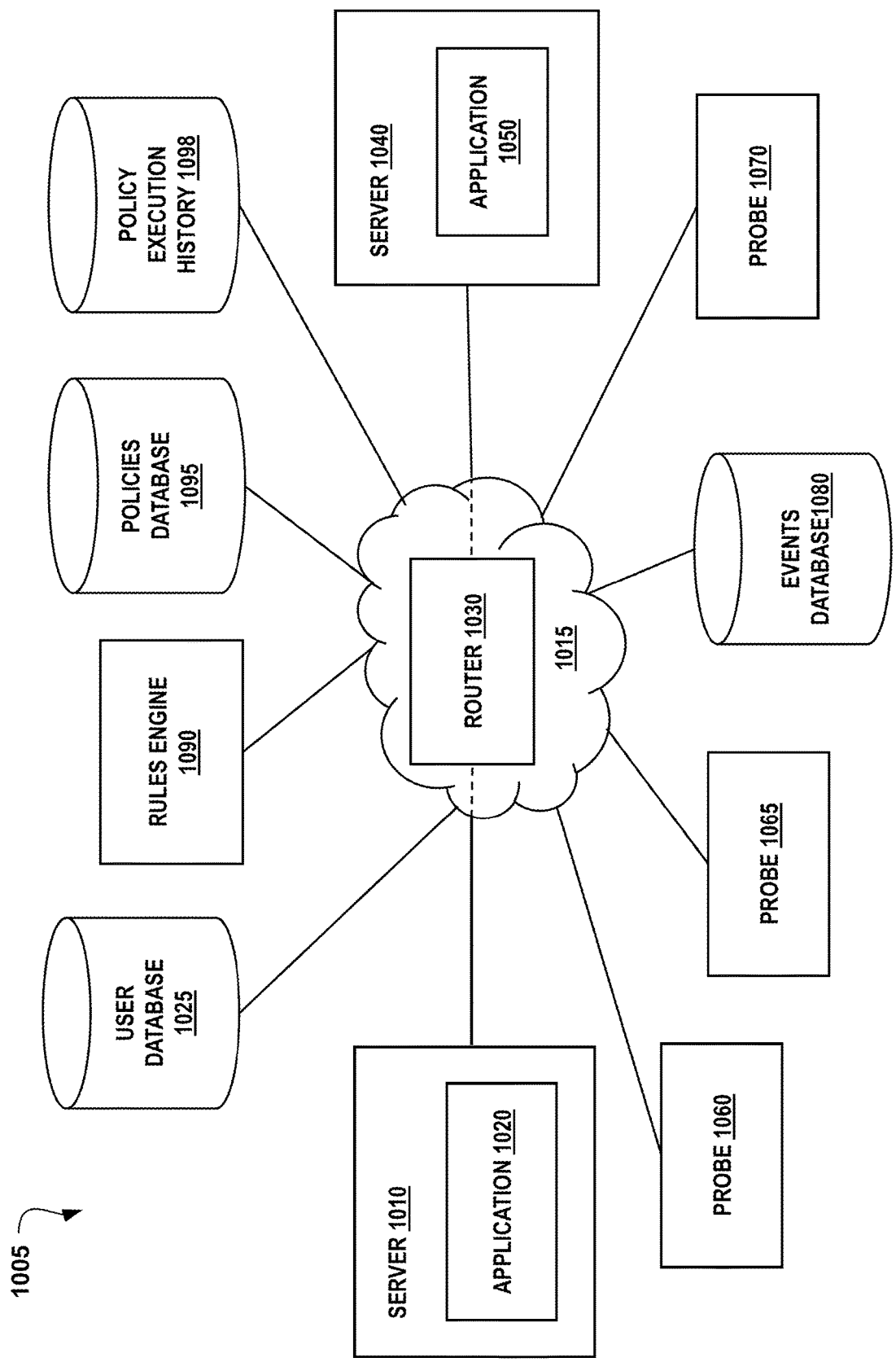
FIG. 2 illustrates an exemplary system in which the present invention may operate, in accordance with an embodiment of the present invention.

FIG. 2 illustrates an exemplary system 1005 in which the present invention may operate, in accordance with an embodiment of the present invention.

A server 1010 comprises a user API application 1020 which is connected via network 1015 (router 1030) to server 1040. Application 1020 retrieves information from user database 1025 and provides it via router 1030 to a mobile banking application 1050, running on server 1040. It will be appreciated that many servers, applications, and other devices may be running in such a system, all connected to one another via network 1015.

As discussed in the background section, events are emitted by all entities in such a system, in order to report their status. Probes 1060, 1065 and 1070 are connected to the network 1015 and are used to capture such event information. Each probe is associated with one or more entities (e.g., servers, applications, networks, routers) in the system (e.g., probe 1060 may be responsible for capturing events emitted by server 1010).

Figure 3:
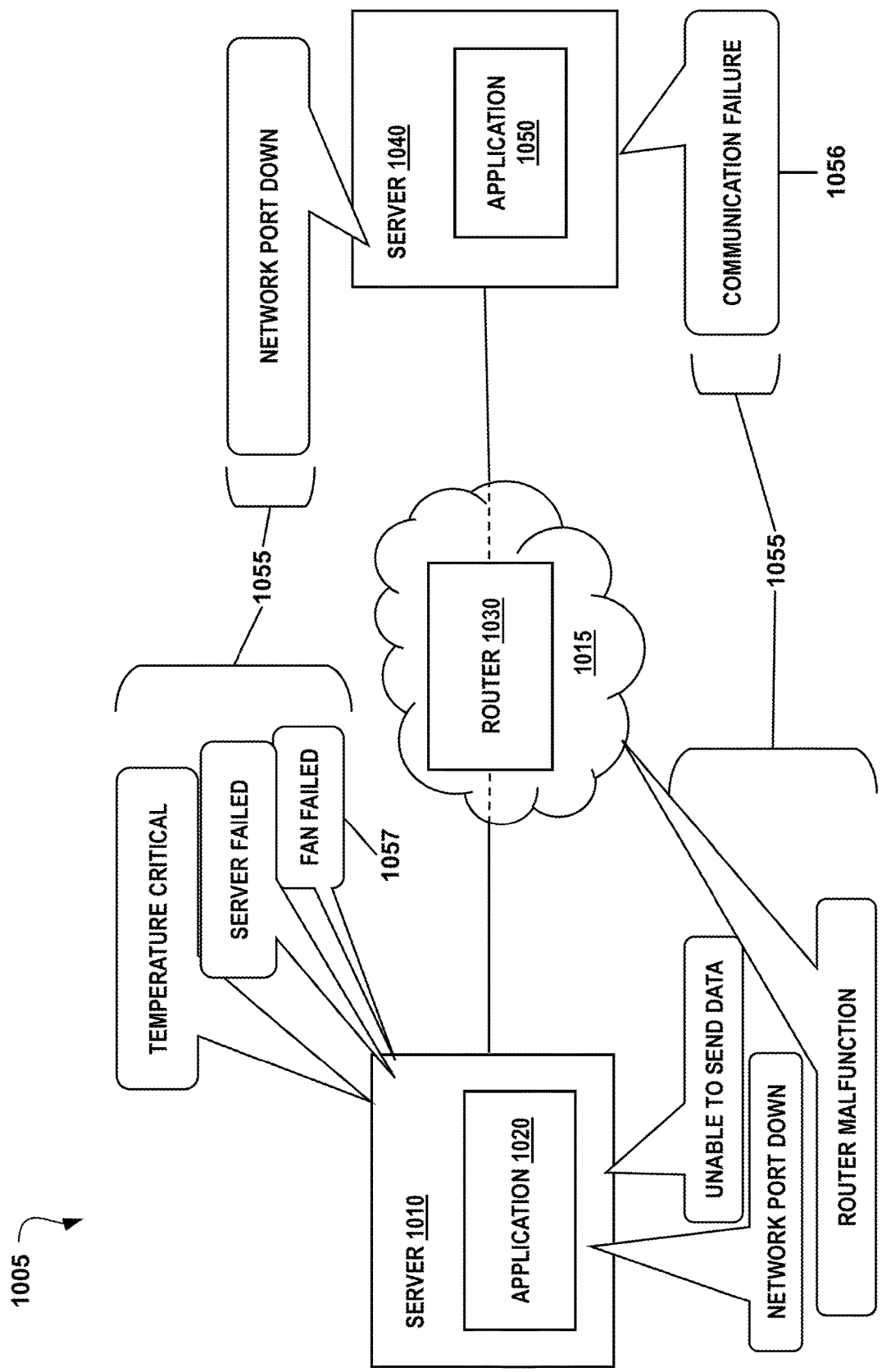
FIG. 3 shows exemplary events emitted by system in accordance with an embodiment of the present invention.

Exemplary events 1055 emitted by system 1005 are shown in FIG. 3. For example, application 1020 may indicate that it is unable to send data; and server 1010 may report that the server has failed, the temperature is critical, the fan is failed and/or a network port is down. Of course, not all events will be reported at the same time. For example, the temperature may become critical and then, sometime later, the fan and server may fail.

Other exemplary events are given. Router 1030 may indicate that there has been a router malfunction; server 1040 may indicate that a network port is down; and application 1050 may report that there has been a communication failure. These are all examples only and a system may produce a diverse set of events in response to different system statuses.

Emitted events may be stored in events database 1080 (as shown in FIG. 2). Such events are useful for system issue (problem) diagnosis and resolution.

Figure 4:
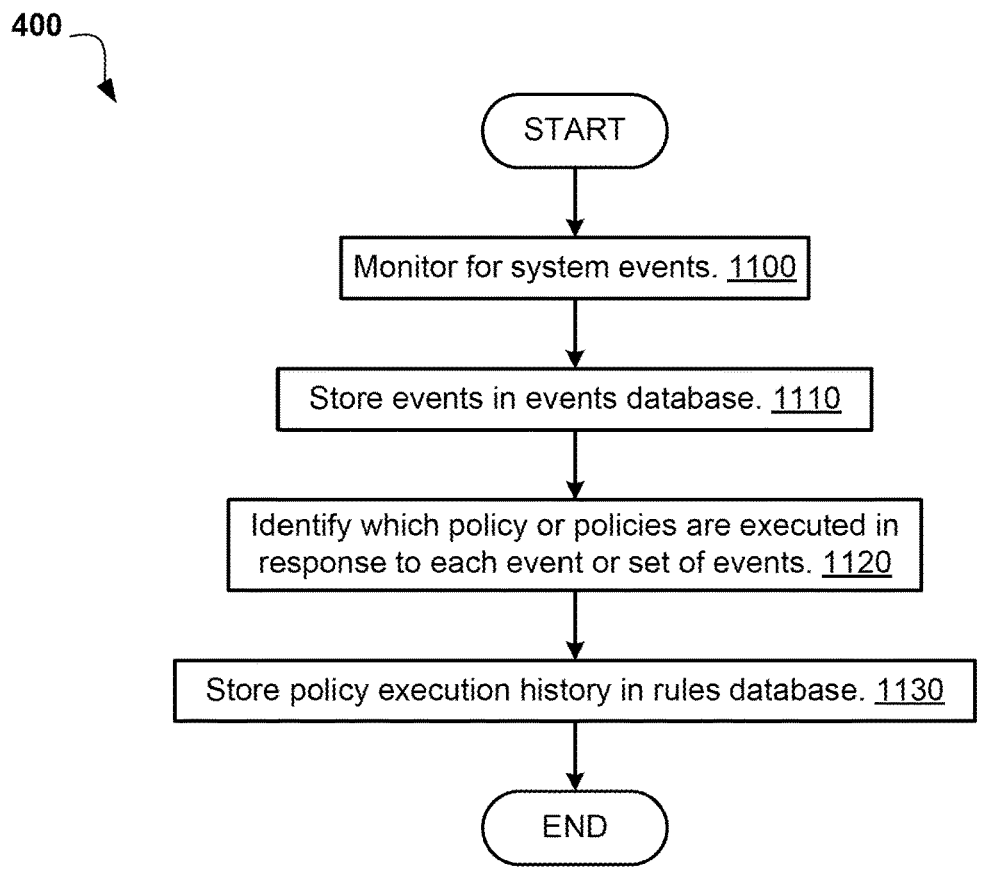
FIG. 4 is a flowchart showing the processing of the present invention in accordance with an embodiment.

FIG. 4 is a flowchart showing how events are used, in accordance with an embodiment 400 of the present invention. Probes 1060, 1065, 1070 monitor their associated entity or entities for events (step 1100) and store these in events database 1080 at step 1110.

Every time one or more events are produced by the system; a probe passes any such events to rules engine 1090 (including rules analysis code 200). Rules engine 1090 works in conjunction with policies database 1095. As shown as step 1120 of FIG. 4, the rules engine identifies which policy or policies are executed in response to a generated event or set of events.

Figure 5:
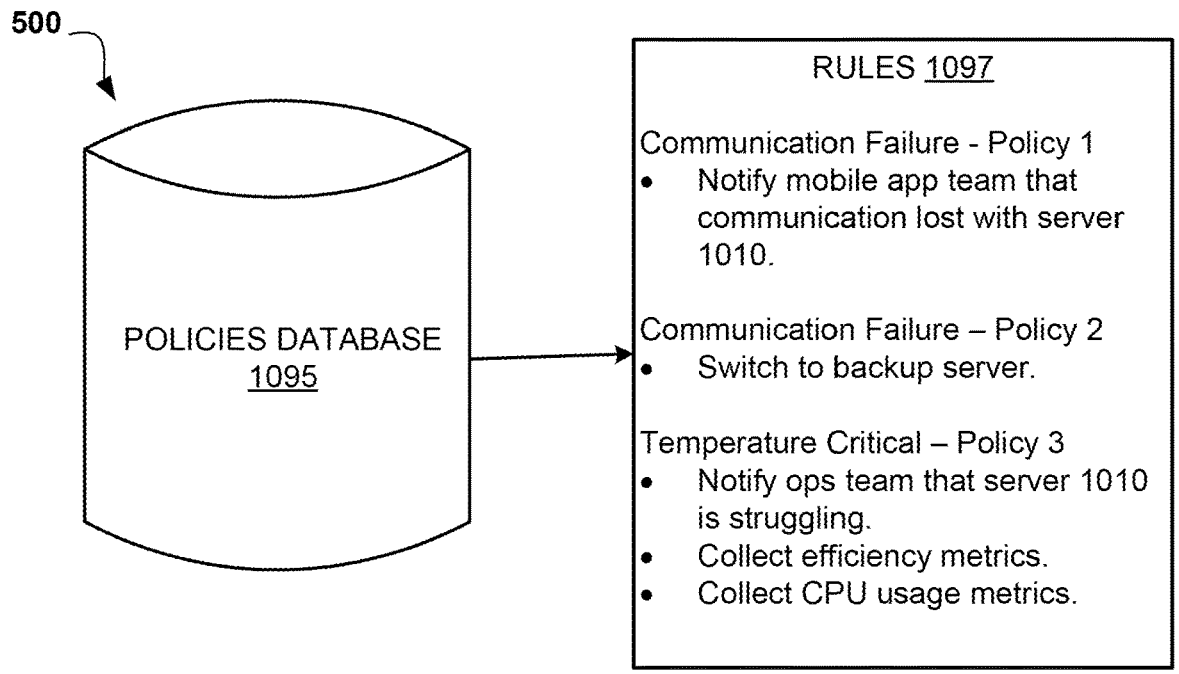
FIG. 5 shows exemplary contents of the policies database.

FIG. 5 shows exemplary contents of the policies database 1095 according to an exemplary embodiment 500. As shown, the database may comprise a number of policies 1097. For example, policies 1 and 2 are executed in response to a communication failure event 1056, as shown in FIG. 3. Policy 3 is executed in response to a temperature critical event 1057. As shown in FIG. 5, policy 1 comprises just one rule, 'Notify mobile app team that communication lost with server 1010'. Policy 2 similarly contains just one rule: 'Switch to backup server'. Policy 3, on the other hand, contains three rules which are all to be executed:

Notify ops team that server 1010 is struggling.
Collect efficiency metrics.
Collect CPU usage metrics.

As the system processes events and other derived artifacts, all policy executions are stored at step 1130 in policy execution history database 1098 (as shown in FIG. 2). The information stored includes the timestamp of execution as well as an identifier that uniquely identifies the policy.

It will be appreciated that FIG. 5 shows some very simple examples for illustrative purposes only. In reality, a system may contain thousands of different policies and each policy may comprises a large set of rules. The policies associated with a system may all be executed in varying and complicated circumstances.

When there are many policies potentially operating on a system, it is not a trivial process to understand the relationship between such policies.

The invention, in accordance with an embodiment, describes a method of identifying/determining clusters/groups of policies which tend to execute at similar times, based on policy execution information; in other words, groups of policies which can be identified as co-occurring because they have executed a predetermined number of times within a specified time window of each other; for example, where the threshold has been met for a plurality of policies to be identified as related and therefore grouped together.

If a set of policies frequently co-occur with each other, this is likely indicative of those policies tending to act on similar populations of entities (e.g., servers, applications etc.) associated with an issue (i.e., events and other higher-level artifacts). By presenting these groupings to the user, the user can better determine which policies are in some way related and use this information to help them understand how the system will respond to incoming events.

Figure 6:
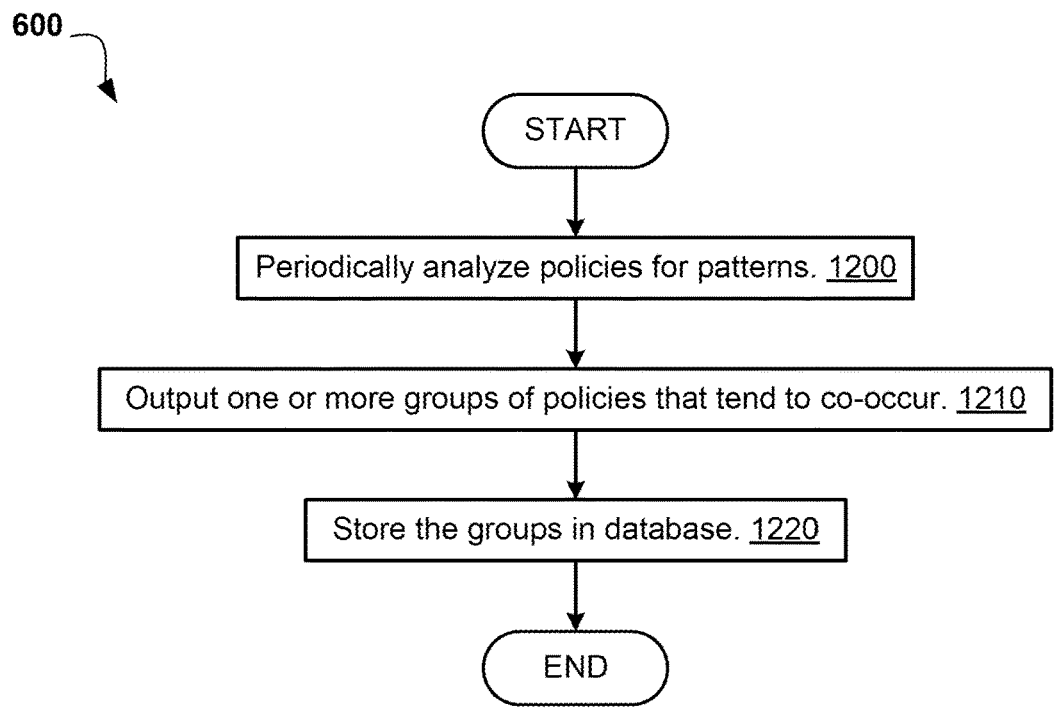
FIG. 6 is a flow chart showing further processing of the present invention in accordance with an embodiment.

In accordance with the exemplary method 600 shown in FIG. 6, processing is performed to determine clusters (groups) of policies which tend to execute at similar times (co-occur), based on historical executions. Periodically (e.g., once a day), an analysis is performed against data stored in policy execution history database 1098 in order to look for patterns (step 1200). The frequency chosen with respect to the operation of the rule analysis algorithm may be chosen such that a pattern or patterns can be observed. The analysis will look at a predetermined amount of historical data (e.g., 3 months' worth of data). By running the analysis, for example daily, new historical data will continually be mined and analysed for patterns.

It will be appreciated that patterns can be identified by a variety of known means. One example is an association rule mining algorithm, such as FP-Growth. The processing at step 1200 acts to find groups of policies which consistently execute within a given time period of each other. One or more groups of policies that tend to co-occur are then output at step 1210 and the groups are stored in a database (not shown) at step 1220.

As previously indicated, each entry in this database includes the unique id of the policy that was executed and the time at which that policy ran. Therefore, a time window can be identified and only those policies whose time stamp falls within that window is mined.

The time window within which policies are deemed to be co-occurring may be a rolling window, set to a duration after which it is unlikely that the input events are related to the same issue (e.g., 20 minutes).

The time window may run (and roll) from the execution of each policy being included in the analysis. This means that if policy 1 executes first and then 19 minutes later policy 2 and 19 minutes after that policy 3, then a relationship between the 3 policies will still be identified.

In another embodiment, there are fixed time windows and policies are only deemed to co-occur if they all occur within a particular fixed time window (e.g., 20-minute chunks).

The number of instances of co-occurrence required to deem a set of policies as related (support) and how similar (consistency) those instances (confidence) may be set empirically based on training data, and/or using a reasonable default value. Support and confidence parameters associated with an association rule mining algorithm determine how many times a given co-occurrence pattern should be seen and also how consistent those patterns should be before deeming a relationship valid. Consistency here means how similar the pattern of policies is required to be. Thus, if policies 1, 2 and 3 co-occur five times, the pattern is consistent. However, if policies 1, 2 and 3 co-occur three times and policies 1 and 2 co-occur twice without policy 3, then all five instances of co-occurrence are not entirely consistent.

If a set of policies frequently co-occur with each other, this is likely indicative of those policies tending to act on similar populations associated with an issue (e.g., events and other higher-level artifacts). By presenting these groupings to the user, the user can better determine which policies are in some way related and use this information to help them understand how the system will currently respond to incoming events.

Figure 7:
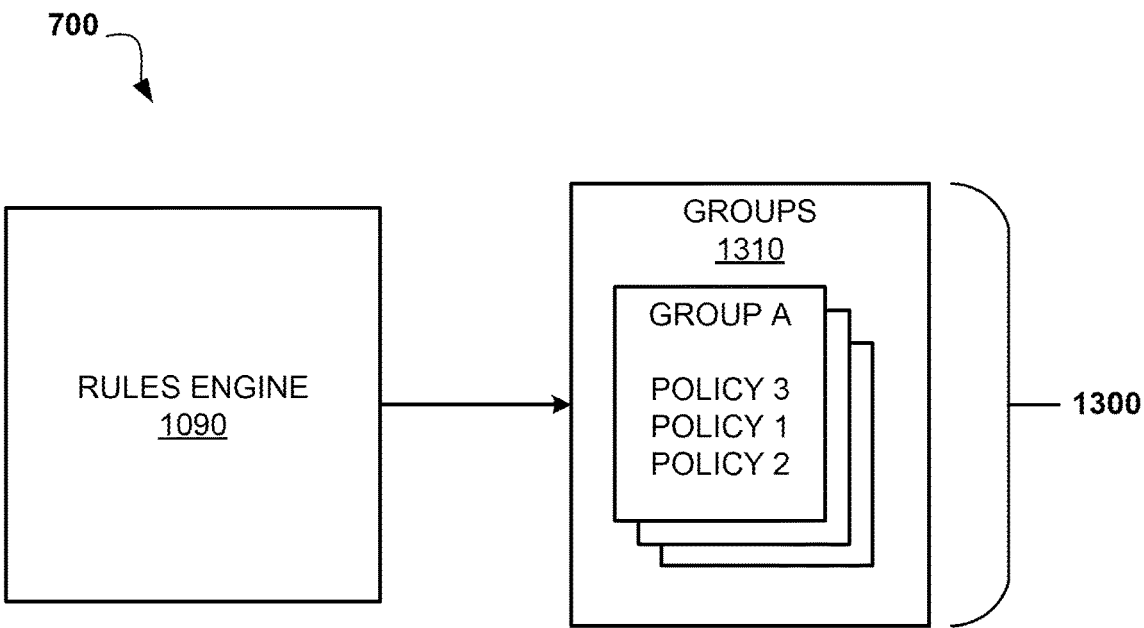
FIG. 7 shows an exemplary output of the rules engine.

An exemplary output of the association rule mining algorithm is shown, in accordance with an embodiment 700, in FIG. 7. In other words, the output 1300 produced at step 1210 of FIG. 6 is a set of groups of policies 1310 that tend to co-occur. One example, Group A, is provided. From FIG. 7, it is possible to see those policies 3, 1 and 2 all tend to co-occur and in that order. Referring to FIG. 5, first there is a temperature critical event with respect to server 1010, this then results in a communication failure event emitted by server 1040, which causes the mobile application team to be notified that communication has been lost with server 1010 (policy 1) and failover to a backup server in place of server 1010 (policy 2). These groups are stored in a database (not shown) for later retrieval at step 1220.

The use of association rule mining is particularly advantageous because this means it is not necessary to analyse the detail of the policies themselves. This is helpful because the policies can be written in any number of ways, and this can make parsing them difficult. Association rule mining means that it is possible to identify which policies are working together.

Using rule analysis such as association rule mining to group co-occurring policies makes it possible to identify new relationships and groupings of policies even where they have entirely distinct conditions or act in response to different events or groups of events. For example, one policy may act on all events that originate from storage infrastructure, whereas another policy may act on all events (e.g., alerts) of type "latency high" within the "London" datacentre. The conditions here are entirely distinct, but it may be that the London datacentre houses the organisations storage infrastructure, so in all cases both policies will act on the same issues.

The information stored at step 1220 of FIG. 6 may be presented to the user and used to make informed decisions. A user interface is provided to list the policies defined within the system. When a user chooses to update one policy listed by the user interface, the system may for example inform that user of other related policies that they should also consider updating at the same time in other words, which group (or groups) a policy forms part of. The system may then suggest to the user that they should consider changing other policies in the same group(s).

As part of this user interface, the policies may optionally be grouped together based on the relationship information identified at step 1210 and stored at step 1220 of FIG. 6. This grouping allows the user to better understand (and visualise) which policies are related and are likely to act against the same issues.

As previously indicated, historic events (and other derived artifacts) may be stored (in events database 1080, as shown in FIG. 2). The information in this database 1080 may then be used by a user to replay events on-demand after they create or modify policies. The resulting policy executions can then be tracked. Such policy executions can then be mined at step 1200 of FIG. 6 in order to generate an updated set of groupings (steps 1210, 1220). The user can then compare the changes in grouping that would result from the update to the set of policies.

As discussed, the invention in accordance with an embodiment, provides a way of grouping (or clustering) policies which are likely to be acting against the same issues. This information can be used to identify and highlight relationships between policies to a user. Policy groupings can, if desired, also be presented directly to the user.

It will be appreciated that it is not essential for policy execution information to be entirely historical. For example, it may be that a new execution of a policy may cause the threshold to be met and result in a particular grouping of policies.

What is claimed is:

1. A method for analysing policies executed in a computer system which comprises a plurality of entities, the system operable to emit a plurality of events providing status information for any of the entities in the system and wherein emitted events cause one or more policies to execute, the method comprising:
   detecting one or more policies within a set of policies that have executed a predetermined number of times within a time window;
   identifying a plurality of co-occurring, and thereby related, policies based on the detecting; and
   grouping the identified co-occurring policies.

2. The method of claim 1, wherein the time window is a rolling time window.

3. The method of claim 1, comprising:
   responsive to a policy executing, determining that the predetermined number has been met for a plurality of policies comprising the set.

4. The method of claim 1, comprising:
   presenting the one or more identified co-occurring policies to a user.

5. The method of claim 1, comprising:
   responsive to a user changing a policy of the set of policies, identifying a group that the changed policy is associated with; and
   displaying suggestions to the user indicating that the user should consider changing one or more additional policies in the identified group.

6. The method of claim 1, wherein the detecting comprises:
   using an association rule mining algorithm to identify relationships between policies.

7. The method of claim 6, wherein a support parameter determines one or more instances of co-occurrence required to identify a group of policies as related, and a confidence parameter determines a required similarity of the instances.

8. The method of claim 7, wherein the support parameter and the confidence parameter are set empirically based on training data or using a default value.

9. The method of claim 5, wherein event information about events emitted by the system is stored in a database, the method comprising:
   responsive to one or more suggestions, making changes to one or more policies within one or more groups;
   replaying, on-demand, one or more events stored in the database;
   tracking one or more resulting policy executions; and
   analysing the policy executions to produce updated policy grouping information.

10. An apparatus for analysing policies executed in a computer system which comprises a plurality of entities, the system operable to emit a plurality of events providing status information for any of the entities in the system and wherein emitted events cause one or more policies to execute, the apparatus comprising:
    one or more processors;
    a memory coupled to at least one of the processors; and
    a set of computer program instructions stored in the memory and executed by at least one of the processors in order to perform a method comprising:
       detecting one or more policies within a set of policies that have executed a predetermined number of times within a time window;
       identifying a plurality of co-occurring, and thereby related, policies based on the detecting; and
       grouping the identified co-occurring policies.

11. The apparatus of claim 10, wherein the time window is a rolling time window.

12. The apparatus of claim 10, wherein the method comprises:
    presenting the one or more identified co-occurring policies to a user.

13. The apparatus of claim 10, wherein the method comprises:
    responsive to a user changing a policy of the set of policies, identifying a group that the changed policy is associated with; and
    displaying suggestions to the user indicating that the user should consider changing one or more additional policies in the identified group.

14. The apparatus of claim 10, wherein the detecting comprises using an association rule mining algorithm to identify relationships between policies, and wherein a support parameter determines one or more instances of co-occurrence required to identify a group of policies as related, and a confidence parameter determines a required similarity of the instances.

15. A computer program product for analysing policies executed in a computer system which comprises a plurality of entities, the system operable to emit a plurality of events providing status information for any of the entities in the system and wherein emitted events cause one or more policies to execute, the computer program product comprising:
 a computer readable storage medium, comprising computer program code that, when executed by a computer performs a method comprising the steps of:
  detecting one or more policies within a set of policies that have executed a predetermined number of times within a time window;
  identifying a plurality of co-occurring, and thereby related, policies based on the detecting; and
  grouping the identified co-occurring policies.

16. The computer program product of claim 15, wherein the time window is a rolling time window.

17. The computer program product of claim 15, wherein the method comprises:
 presenting the one or more identified co-occurring policies to a user.

18. The computer program product of claim 15, wherein the method comprises:
 responsive to a user changing a policy of the set of policies, identifying a group that the changed policy is associated with; and
 displaying suggestions to the user indicating that the user should consider changing one or more additional policies in the identified group.

19. The computer program product of claim 15, wherein the detecting comprises using an association rule mining algorithm to identify relationships between policies, and wherein a support parameter determines one or more instances of co-occurrence required to identify a group of policies as related, and a confidence parameter determines a required similarity of the instances.

20. The computer program product of claim 18, wherein event information about events emitted by the system is stored in a database, the method comprising:
 responsive to one or more suggestions, making changes to one or more policies within one or more groups;
 replaying, on-demand, one or more events stored in the database;
 tracking one or more resulting policy executions; and
 analysing the policy executions to produce updated policy grouping information.

* * * * *